United States Patent [19]

Pritchard

[11] Patent Number: 4,641,186
[45] Date of Patent: Feb. 3, 1987

[54] MOTION DETECTOR THAT EXTRACTS MOTION INFORMATION FROM SIDEBANDS OF A BASEBAND TELEVISION SIGNAL

[75] Inventor: Dalton H. Pritchard, Princeton, N.J.

[73] Assignee: RCA Corporation, Princeton, N.J.

[21] Appl. No.: 607,122

[22] Filed: May 3, 1984

[51] Int. Cl.⁴ .............................................. H04N 7/18
[52] U.S. Cl. ...................................... 358/105; 358/31
[58] Field of Search ................. 358/105, 108, 167, 31, 358/160, 37, 36, 38

[56] References Cited

U.S. PATENT DOCUMENTS

| 3,564,122 | 2/1977 | Wise | 358/31 |
|---|---|---|---|
| 3,707,596 | 12/1972 | Kuhn | 358/31 |
| 3,836,707 | 9/1974 | Murakami et al. | 358/31 |
| 4,179,705 | 12/1979 | Faroudja | 358/31 |
| 4,456,921 | 6/1984 | Hess | 358/31 |
| 4,553,158 | 11/1985 | Acampora | 358/31 |

FOREIGN PATENT DOCUMENTS

| 0130685 | 8/1983 | Japan | 358/105 |
|---|---|---|---|
| 0023973 | 2/1984 | Japan | 358/31 |

OTHER PUBLICATIONS

Article by M. Achiha et al., entitled, "A Motion Adaptive High-Definition Converter for NTSC Color TV Signals", submitted to the 13th International Television Symposium in Montreaux, Canada, May 1983.

U.S. patent application Ser. No. 226,712, filed Jan. 21, 1981, entitled, "Dropout Compensation in a Video Relay System, by R. N. Hurst.

Primary Examiner—Howard W. Britton
Assistant Examiner—Victor R. Kostah
Attorney, Agent, or Firm—P. J. Rasmussen; P. M. Emanuel; R. G. Coalter

[57] ABSTRACT

A motion detector for detecting motion in a picture contained in a television signal includes a filter that extracts a portion of the frequency spectrum of the television signal. The amplitude of the sidebands of the television signal in this portion of the frequency spectrum is indicative of motion in the picture scene. The signal from the filter is coupled to a peak detector that produces a motion indicative signal. The amplitude of the motion signal is proportional to the absolute value of the amplitude of the sidebands in this portion of the spectrum.

13 Claims, 9 Drawing Figures

MOTION DETECTOR 37A OF FIGURE 6

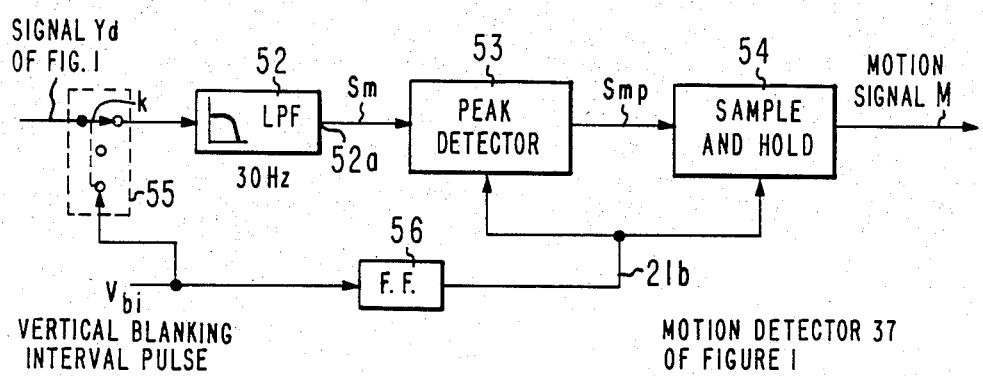
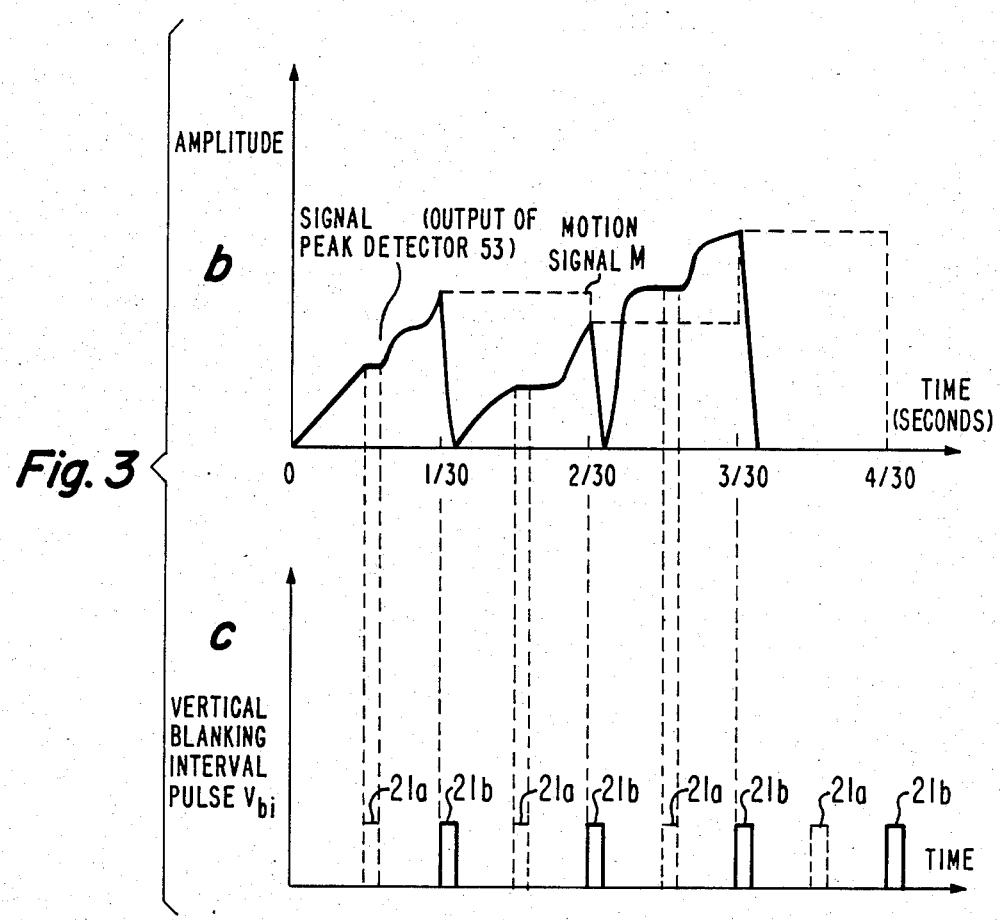
Fig. 3

MOTION DETECTOR THAT EXTRACTS MOTION INFORMATION FROM SIDEBANDS OF A BASEBAND TELEVISION SIGNAL

The invention relates to movement or motion detection in a picture that is contained in a television video signal. Such motion detectors are useful in television systems utilized in surveillance-type tasks for activating anti-intrusion devices, and in television receivers in conjunction with noise and artifacts reduction techniques.

BACKGROUND OF THE INVENTION

A well-known method of detecting motion in a video signal utilizes a frame store for storing the video signal of an entire picture frame. The video signal that contains the picture information of a subsequent picture frame is compared with the stored video signal. The result of such comparison provides a motion signal. This is so because motion causes the content of a pixel in the incoming video signal to be different from the corresponding pixel in the already stored frame. A disadvantage of using this method, however, is that a costly frame store is required.

One example in which the motion detector of the invention may be used is a television apparatus for displaying the picture information of a television signal that was produced by an interlaced scanning process, hereinafter referred to as the interlaced signal, in a non-interlaced scanning format. The motion detector of the invention is particularly useful when such television apparatus utilizes a line store memory for adapting the interlaced signal for display in the non-interlaced scanning format. The adaptation to non-interlaced scanning format is aimed at reducing certain artifacts that are caused by displaying a picture using the interlaced scanning format at the television receiver, as described below.

In broadcast systems such as the 525 line-per-frame, 30 frame-per-second 525/30 NTSC system or the 625/25 PAL system, artifacts occur because of the interlaced scanning process. This process divides the 525-line picture or frame of the NTSC standard into two successive 262½-line fields. The 262½ lines of one field are scanned in 1/60th of a second followed by scanning of an additional 262½ lines of another field with lines of the second field occupying the spaces between the lines of the first field. One subjective effect of this interlaced scan is to create in the presence of motion in the picture scene an apparent vertical drift of the lines of the raster known as "line crawl". The apparent drift is substantially more noticeable when viewing a wide-screen display at close range. Another well-known objectionable visible effect is interline flicker on line-to-line transitions that occurs because of the interlaced scanning format.

Recent interest in the development of high definition television systems (HDTV) has been directed towards techniques that are intended to enhance the subjective performance of present systems within the constraints of existing standards. One approach, a technique referred to as progressive scan, or non-interlaced scan, has been described in patent materials and literature. For example, all the scan lines are scanned consecutively from the top of the display screen and downward to the bottom of the display screen during each vertical scanning interval of, for example, 1/60th of a second. Progressive scan results in the reduction of artifacts related to the interlaced scanning format, such as interline flicker and line crawl that exist in conventional two-to-one interlaced displays. The subjective effect is a more pleasing picture presentation to the viewer.

In U.S. patent application Ser. No. 526,702, filed Aug. 26, 1983, entitled, PROGRESSIVE SCAN TELEVISION SYSTEM EMPLOYING VERTICAL DETAIL ENHANCEMENT, in the name of D. H. Pritchard and W. E. Sepp (which issued Dec. 10, 1985, as U.S. Pat. No. 4,558,347), an apparatus for displaying the picture information of, for example, a baseband NTSC signal is disclosed. The television apparatus that is disclosed in the Pritchard et al. application generates, during each horizontal video line time of the NTSC signal, a pair of luminance information containing signals. The picture information that is produced in one of the pair of signals, during each horizontal video line time of the NTSC signal, is displayed in a first scan line of the display and that of the other is displayed immediately afterward in the next adjacent scan line below the first scan line. In order to display the luminance information that is included in both signals during one horizontal scan line time of the NTSC signal, each one is speeded up, or compressed. Thus, in the television apparatus of Pritchard et al., picture information is displayed in a given pair of scan lines during the same period in which picture information, in the standard interlaced television receiver, is displayed in only one scan line.

Each signal of the pair of luminance signals is generated using a line comb filter. Because of the interpolation or the averaging process that occurs in the summation process of the line comb filter, some loss of vertical detail occurs. Such loss of vertical detail may be noticeable in the section of the display where picture vertical transitions occur. The Pritchard et al. application discloses an approach for reinserting vertical detail signal components to compensate for the loss that occurs as a result of the averaging process. There, the vertical detail is obtained from the subtraction process in a comb filter source and reinserted in a specific manner to enhance the subjective vertical sharpness and to produce a "clean" subjective picture.

The non-interlaced scanning format reduces interline flicker and line crawl type artifacts that arise from the interlaced scanning format in standard television displays. However, artifacts caused by the interlaced scanning process at the source of the interlaced signal, such as at the television camera, are not eliminated by the non-interlaced scanning format of the television receiver. Furthermore, when vertical detail enhancement process is employed in the television receiver, such as disclosed in the Pritchard et al. application, the visibility of such source related artifacts may even be increased. Such artifacts are caused at the source of the interlaced television signal by the aliasing components that are included in the interlaced NTSC signal. The aliasing components in the interlaced NTSC signal are generated as a consequence of the overlapping of the field-to-field sidebands generated by the sampling process that is inherent in producing interlaced signals at the camera.

Because of the interlaced scanning format that is used at the source, the frequency spectrum of the signal that is produced by the television camera includes integer multiples of the horizontal scanning frequency of illustratively 15734 Hz with sidebands, of illustratively multiples of 30 Hz, the vertical rate, above and below each multiple of the horizontal scanning frequency. In processing a still image at the camera, the sidebands produced include frequencies that are spaced from the horizontal scanning frequency by integer multiples of 30 Hz. Because of the shape of the scanning spot at the camera, these sidebands may include aliasing components. These aliasing components are visible when the vertical components of moving objects are displayed in the television receiver display, and also when differences in the scene content due to television camera vertical panning occur from one field time to the immediately following one. Such differences in the scene are generally referred to as motion in the picture scene. When motion occurs, it may be desirable to omit the vertical detail enhancement to reduce the visibility of the artifacts that may be caused by the camera aliasing edge components.

SUMMARY OF THE INVENTION

One aspect of the invention is a motion detector that requires substantially less total pixel storage capacity than in either a frame or a field store.

Another aspect of the invention is that the motion detector of the invention extracts a portion of the spectrum of a television signal, such as the NTSC signal, to obtain motion information. The amplitude of the sidebands representative of the sampled data process in this portion of the spectrum is highly indicative of motion in the picture scene.

Yet another aspect of the invention is that in one embodiment, the motion detector of the invention extracts the motion indicative sideband components by employing a recursive filter to improve the signal-to-noise ratio in the motion indicative signal formed by the motion detector.

BRIEF DESCRIPTION OF THE DRAWING

FIG. 3a illustrates a block diagram of a motion detector embodying the invention that generates the motion indicative signal;

FIGS. 3b and c are useful in explaining operation of the motion detector of FIG. 3a;

DETAILED DESCRIPTION OF THE INVENTION

Figure 1:
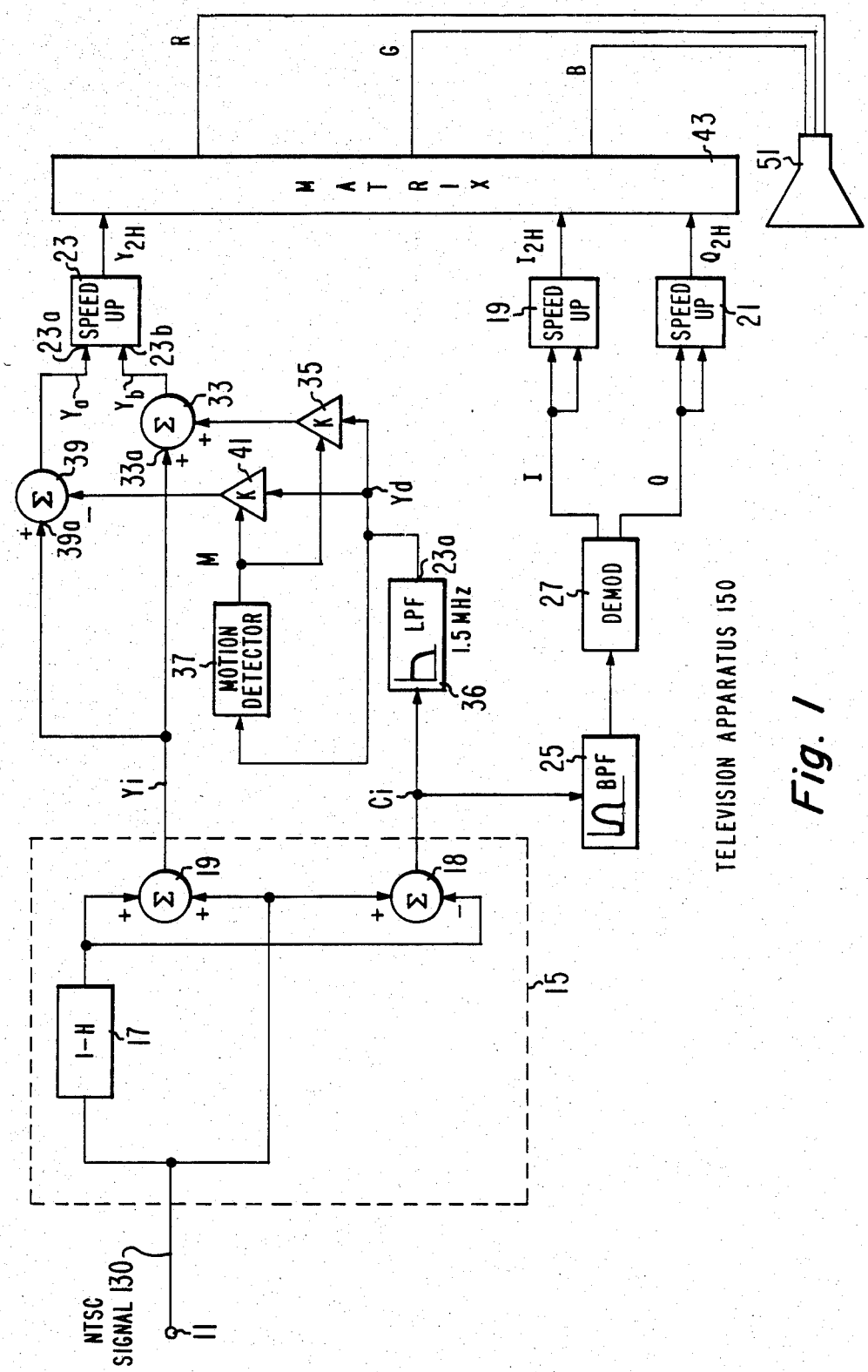
FIG. 1 illustrates a television apparatus that produces signals containing enhanced picture detail in accordance with a motion indicative signal, generated by a motion detector embodying the invention, for displaying the enhanced picture in non-interlaced scanning format.

Referring to FIG. 1, an analog, composite, interlaced-scan color television NTSC signal 130 is applied to a terminal 11 from a source which is not shown. The source of the analog signal may be the demodulated output of the intermediate-frequency (IF) stage of a standard television receiver. It should be noted that the present invention will be described with reference to an NTSC composite, interlaced, color television signal, however, it should be obvious to one of skill in the art that other composite, or component, interlaced color television systems, such as PAL, fall within the scope of the invention described herein.

NTSC signal 130 is applied to a separator 15 which, illustratively, may be a two-terminal transversal filter having a 1-H delay 17, also known as a comb filter. A 1-H delay is equal to the time required to scan a horizontal line in an NTSC signal, e.g., 63.5 $\mu$s. In separator 15 the 1-H delayed signal is combined in an adder 19 with NTSC signal 130 to form an interpolated signal Yi which is combed. Signal Yi represents an estimated signal between successive video lines. Signal Yi is the luminance-representative component of NTSC signal 130 having a frequency spectrum with signal energy concentrated in the vicinity of integer multiples of the line rate, (i.e., 15,734 Hz) and nulls of signal energy in the vicinity of odd integer multiples of one-half of the line rate.

Similarly, delayed and undelayed lines are applied to a subtractor 18 which provides a combed chrominance signal Ci representing a portion of the luminance information and the chrominance information having a frequency spectrum with signal energy concentrated in the vicinity of odd integer multiples of one-half of the line rate (i.e., 15,734 Hz) and nulls of signal energy in the vicinity of integer multiples of the line rate. Chrominance signal Ci from subtractor 18 is bandpass filtered in a bandpass filter 25 to provide the combed modulated chrominance information to a demodulator 27. Demodulator 27 of conventional design provides the demodulated I and Q signals to speed-up processors 19 and 21, respectively.

Speed-up processors 19 and 21 produce time-compressed I and Q signals compressed at a multiple (e.g., two-times) of the input rate. For each horizontal video line of NTSC signal 130, speed up processor 19, for example, generates, two video lines of an $I_{2H}$ signal. Each of the two video lines of $I_{2H}$ signal contains the same I information as in the corresponding uncompressed video line of the I signal. The I information in each of the two video lines of $I_{2H}$ signal is speeded up to occupy ½ the time it occupies in the corresponding I signal. Speed up processor 19 generates, in a similar manner, a $Q_{2H}$ signal from the Q signal. Speed-up processors 19 and 21 may be implemented as described in U.S. patent application Ser. No. 526,701, entitled, "PROGRESSIVE SCAN SPEED-UP PROCESSOR", filed Aug. 26, 1983, in the name of W. E. Sepp (which issued Oct. 29, 1985, as U.S. Pat. No. 4,550,336), herein incorporated by reference. The twice rate $I_{2H}$ and $Q_{2H}$ signals are coupled to an I,Q,Y matrix 43 for generating R, G and B signals, as discussed later on.

Luminance signal Yi is coupled to an input terminal 39a of a subtractor 39 and to an input terminal 33a of an adder 33. Chrominance signal Ci is coupled through a low pass filter 36, having a cutoff frequency of illustratively 1.5 MHz to form a vertical detail enhancement signal Yd at a terminal 23a. As explained below, signal Yd reinserts the vertical details in luminance signal Yi that were reduced in the combining process conducted in adder 19.

Signal Yd is coupled through a gain controlled device 35 that is described later on, to the other input terminal of adder 33. Adder 33 sums the signals at its respective input terminals to produce a $Y_b$ signal that provides luminance information, as described later on. Likewise, vertical detail signal Yd is coupled through a gain controlled device 41, illustratively similar to gain controlled device 35, to the other input terminal of subtractor 39 where it is subtracted from luminance signal Yi. The result of the subtraction in subtractor 39 is a $Y_a$ signal that also provides luminance information, as described later on.

Assume that the gain factor K of device 35 and device 41, respectively, is equal to 1. During each active video line time of NTSC signal 130, $Y_a$ signal contains substantially all the luminance vertical details, up to the cutoff frequency of filter 36, of the portion of NTSC signal 130 that was coupled to terminal 11 during the immediately preceding active video line time of NTSC signal 130. Simultaneously, $Y_b$ signal contains substantially all the luminance vertical details, up to the cutoff frequency of filter 36, of a portion of NTSC signal that was coupled to terminal 11 during the current active video line time of NTSC signal 130.

$Y_a$ signal and $Y_b$ signal are coupled to input terminals 23a and 23b, respectively, of a speed-up processor 23 that operates similarly to speed-up processor 19 or 21. In general, speed-up block 23, for example, may include four delay lines, each providing one horizontal line time delay, which are clocked-in at the four-times the color subcarrier rate (4 sc) and read out by a commutation process at eight times the subcarrier rate (8 sc). Thus, the output from speed-up block 23 is continuous video at two-times the horizontal line frequency producing a twice rate $Y_{2H}$ signal.

During each horizontal video line time of 63.5 microseconds of NTSC signal 130, a video line of time-compressed signal $Y_a$ alternates with a video line of time-compressed signal $Y_b$ to provide luminance information for display in a pair of immediately consecutive non-interlaced scan lines, respectively. During each 63.5 microsecond, signal $Y_{2H}$ includes two signal portions that contain the luminance information of $Y_a$ and $Y_b$ signals, respectively, in two consecutive time slots, each of 63.5/2 microseconds duration.

In each 63.5 microseconds of the horizontal video line time of NTSC signal 130, signal $I_{2H}$, that is the I signal speeded up in speed up processor 19, includes two signal portions that provide I picture information for display in a pair of immediately consecutive non-interlaced scan lines, respectively. Simultaneously, signal $Q_{2H}$, that is the Q signal speeded up in speed-up processor 21, includes two signal portions that provide Q picture information for display in the pair of immediately consecutive scan lines, respectively. Signal $Q_{2H}$ is combined in an I,Q,Y matrix 43 with signals $I_{2H}$ and $Y_{2H}$ on a non-interlaced, line-by-line basis, in a known manner, to form time-compressed R, G and B signals. The information contained in the time-compressed R,G,B signals is displayed on the screen of display 51 by means of, for example, a progressively scanned raster display.

As disclosed in the Pritchard et al. application, herein incorporated by reference, the gain factor K of gain controlled devices 41 and 35, respectively, may be such that vertical peaking is produced in $Y_a$ signal and in $Y_b$ signal, respectively. It should be understood that the gain factor K of gain controlled device 41 may be different from that of gain controlled device 35. If K is greater than 1 in device 41 or 35, vertical transitions "overshoot" in amplitude or intensity in comparison to the situation in which K=1. This enhancement of vertical details may provide for a more subjectively pleasing picture.

Vertical detail representative signal Yd, is also coupled to a motion detector 37 that embodies the invention and that produces a motion signal M in response to motion in NTSC signal 130. Motion signal M provides, illustratively, a constant level output during each frame time of NTSC signal 130 outside the vertical blanking interval. The voltage level of signal M in each frame time is indicative of the degree of motion in the picture scene. The inventive motion detector 37 is described later in detail. Motion signal M controls the gain factor K of gain control devices 41 and 35, respectively.

Figure 4:
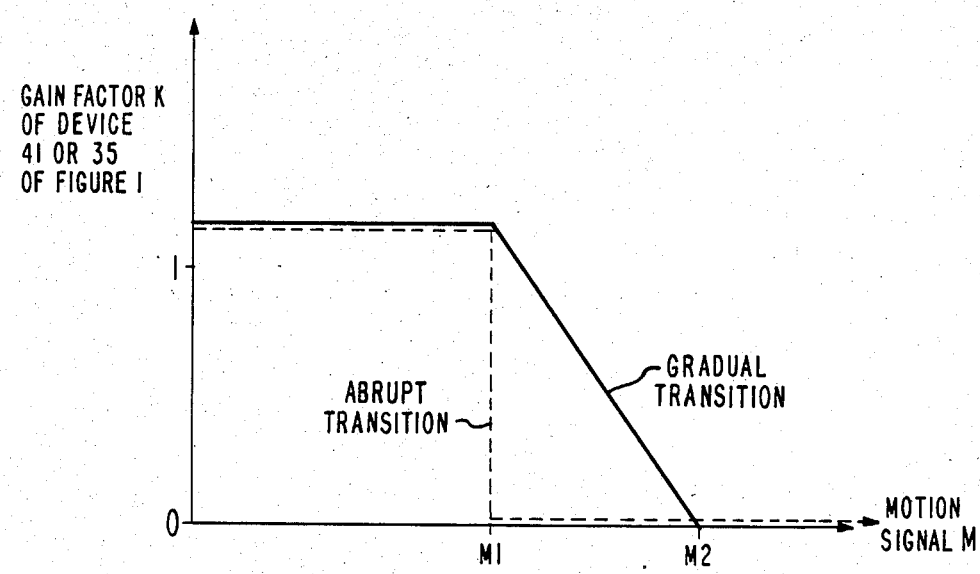
FIG. 4 illustrates two examples of the dependency between the gain factor K of one of the gain controlled devices used in the apparatus of FIG. 1 and the motion indicative signal.

FIG. 4 illustrates two examples of the dependency of gain factor K of each of gain controlled devices 35 and 41 on motion signal M. In the first example that is illustrated by the dashed line in FIG. 4, K assumes one of two possible states. When motion signal M exceeds a threshold level M1, K is equal to zero. Otherwise, it is equal to a predetermined value, such as K>1. Here K exhibits an abrupt change between the two states. In the second example that is illustrated by the solid line, the gain factor K decreases gradually when M exceeds a threshold level M1. Threshold level M1, in the two examples, is established to minimize the effects of noise. When motion signal M exceeds level M1, in the first example, or level M2 in the second example, vertical detail enhancement is appropriately diminished. On the other hand, when motion signal M is at a level that is lower than M1, as illustrated in FIG. 4, corresponding to no substantial degree of motion in the picture scene, the enhancement of vertical detail is at a maximum.

As explained before, vertical detail enhancement is omitted or diminished under motion conditions in order to reduce the visibility of artifacts that are attributable to aliasing components in NTSC signal 130 produced at the source of NTSC signal 130. As explained in U.S. patent application Ser. No. 607,121 entitled, "A TELEVISION RECEIVER USING NON-INTERLACED SCANNING FORMAT WITH VERTICAL DETAIL ENHANCEMENT AND MOTION COMPENSATION", in the name of D. H. Pritchard filed concurrently herewith and incorporated by reference herein, the function, representing the variations of gain factor K of devices 41 or 35, or of both, relative to motion signal M, may be chosen to provide a tradeoff between the extent of reduction of the aliasing component induced artifacts and the extent of picture sharpness in the presence of motion.

Figure 2:
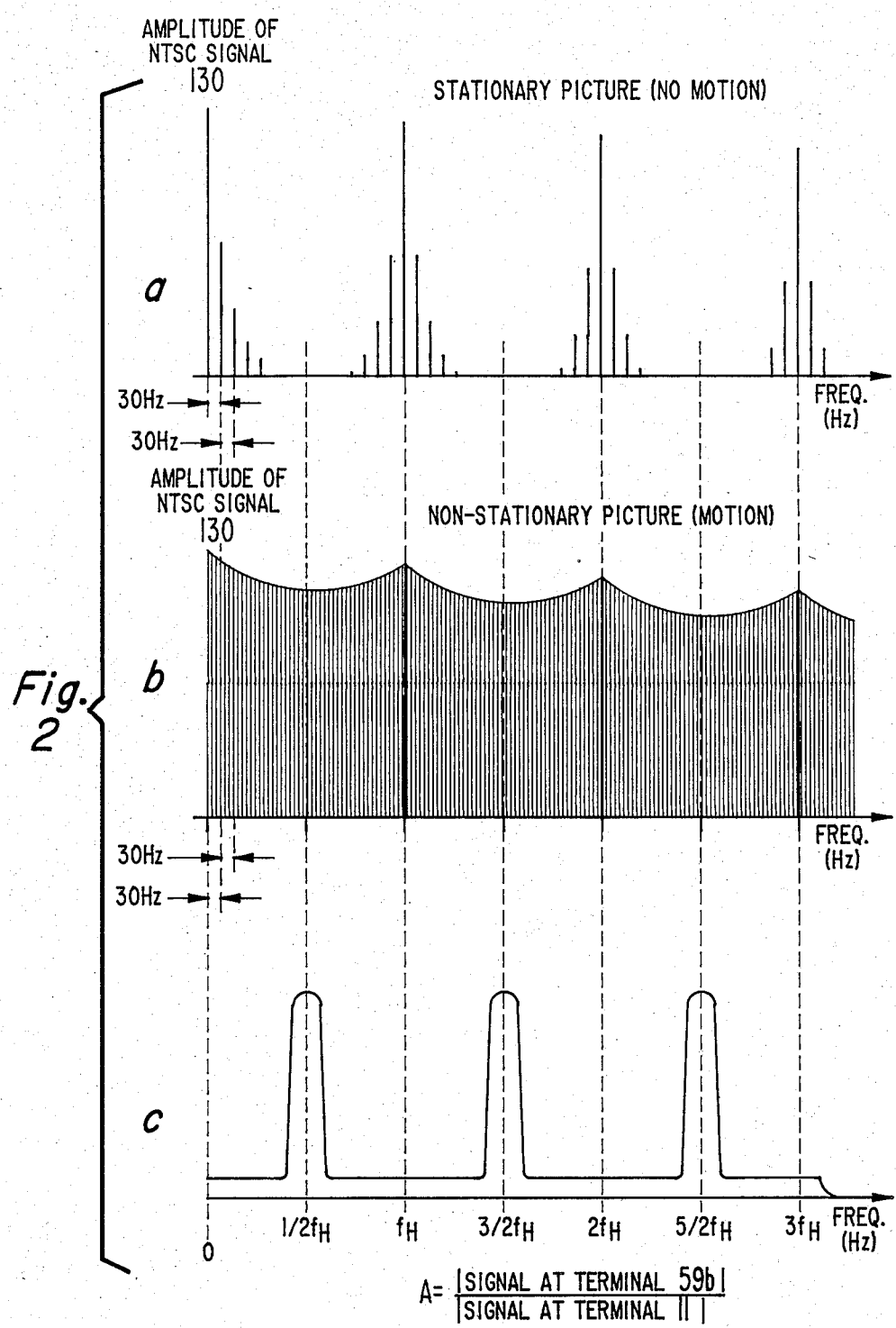
FIGS. 2a and b illustrate the frequency spectrum of an NTSC signal for stationary and for non-stationary pictures, respectively.
FIG. 2c illustrates a transfer function of the recursive filter in the embodiment of FIG. 7.

FIG. 2a illustrates the well-known frequency spectrum of NTSC signal 130 of FIG. 1 representing a stationary picture. Note that in the vicinity of odd multiples of one-half the horizontal line frequency $f_H=15734$ KHz, of incoming NTSC signal 130, there is negligible spectral content; whereas spectral energy may appear at an integer or zero multiple of the frequency $f_H=15734$ KHz and at sidebands spaced by multiples of the frame rate of 30 Hz above and below. Also note that in the absence of motion, the first sideband may appear at 30 Hz. The energy in the sidebands that are further away from a given multiple of $f_H$ is reduced, for example, in exponential manner.

FIG. 2b illustrates the frequency spectrum of NTSC signal 130 of FIG. 1 representing a non-stationary picture. In contrast to the situation illustrated in FIG. 2a, here the spectral content of sidebands that are further away from a given multiple of $f_H$ is not negligible. For example, the spectral content in the vicinity of odd multiples of one-half the horizontal scanning frequency is not negligible. In addition, sidebands appear in frequencies that are not present for a stationary picture; for example, spectral content appears between f=0 and f=30 Hz. The concept behind motion detector 37 of FIG. 1 that embodies an aspect of the invention is that motion signal M is made to be indicative of that spectral content that is created as a result of motion. For example, the presence of energy in a portion of the spectrum of NTSC signal 130 between f=0 and f=30 Hz is indicative of motion.

FIG. 3a illustrates an example of motion detector 37 of FIG. 1, embodying an aspect of the invention. FIGS. 3b and c illustrate timing diagrams helpful in explaining motion detector 37 of FIG. 3a. Identical numbers in FIGS. 1 and 3a–c indicate similar items or functions. In FIG. 3a, vertical detail signal Yd that is combed is coupled through a wiper k of a switch 55 and through a low pass filter 52, having a cutoff frequency, of illustratively 30 Hz, the vertical rate, to form motion sidebands representative signal Sm at a terminal 52a. Note that signal Yd contains no component at zero frequency because of the combing process that is accomplished in separator 15.

Figure 5:
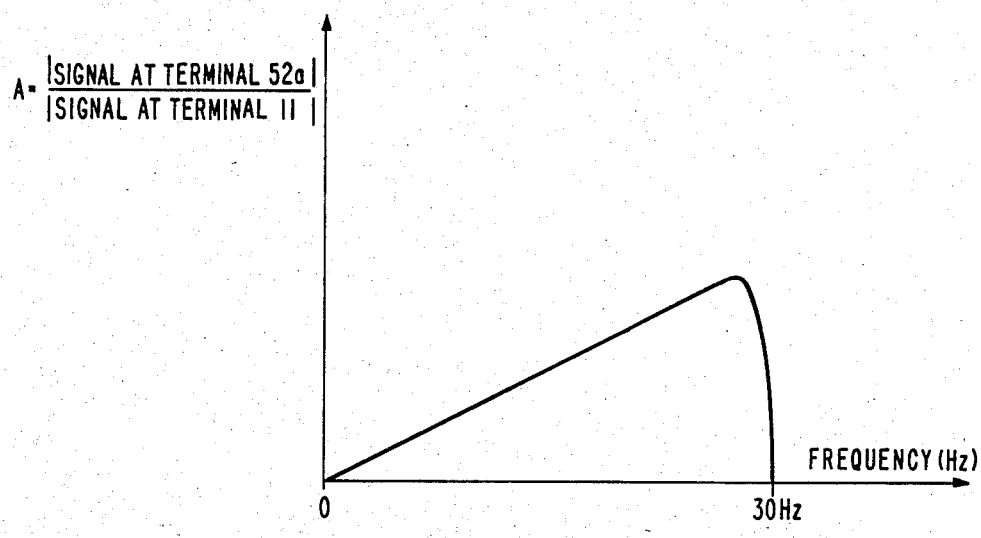
FIG. 5 illustrates an example of a transfer function A of a filter circuit of FIG. 1, as a function of frequency.

FIG. 5 illustrates a transfer function A representing the ratio, as a function of frequency, between the absolute values of the input signal at terminal 52a of FIG. 3a and that of the signal at terminal 11 of FIG. 1. From FIG. 5 it is apparent that only the low end of the spectrum of NTSC signal 130 of FIG. 1 is coupled to terminal 52a of FIG. 3 to form signal Sm. Because spectral content of NTSC signal 130 of FIG. 1 between f=0 and f=30 Hz appears only in the case of motion in the picture scene, the amplitude of signal Sm is indicative of motion in the picture scene.

Signal Sm is coupled to a peak detector 53 that produces a signal Smp that is indicative of the absolute value of the peak voltage of signal Sm. Signal Smp is coupled to a sample and hold circuit 54 that stores the level of signal Smp at the beginning of every other vertical retrace period to produce motion signal M, as illustrated by the dashed lines in FIG. 3b. Each of sample and hold circuit 54 and peak detector 53 of FIG. 3a may be controlled by pulses 21b of FIG. 3a that occur at the beginning of every other vertical retrace period, as illustrated in FIG. 3c. Pulses 21b may be derived from vertical blanking interval pulses $V_{bi}$, conventionally derived. Pulses $V_{bi}$ are illustrated schematically by the pulses 21a and b in FIG. 3c. Pulses $V_{bi}$ are coupled through a flip-flop 56 of FIG. 3a to provide one pulse 21b for every pair of pulses $V_{bi}$.

Peak detector 53 may include a capacitor, not illustrated in FIG. 3a, that is charged to the absolute value of the peak voltage of signal Sm during each period of 1/30 of a second and that is discharged under the control of pulse 21b, as illustrated by the solid lines in FIG. 3b. Thus the voltage of signal Smp of FIG. 3a and b may represent the peak voltage of signal Sm during the preceding 1/30 of a second. Detector 37 of FIG. 3a extracts motion information from sidebands of NTSC signal 130 between f=0 and f=30 Hz. Pulses 21b appear every 1/30 of a second, which is sufficient time for obtaining the peak voltage of the sidebands below f=30 Hz to produce signal Smp. These sidebands are indicative of motion because only non-stationary picture scene causes NTSC signal 130 to contain sideband energy between f=0 Hz and f=30 Hz.

Switch 55 of FIG. 3a blocks NTSC signal 130 during each vertical blanking interval from being coupled to low pass filter 52. This is done under the control of vertical blanking interval pulse $V_{bi}$ to cause only active picture video lines to affect motion signal M.

In known motion detectors that utilize field or frame stores, video lines of consecutive fields or frames are directly and simultaneously compared or subtracted to form a motion signal. Such direct simultaneous operation between two video lines that are separated by a field time or by a frame time is not required in motion detector 37 of FIG. 3a. Motion detector 37 of FIG. 3a extracts motion information from sidebands that appear only when motion occurs. Because motion information is obtained from the frequency spectrum of NTSC signal 130 of FIG. 1, a simple, inexpensive motion detector 37 of FIG. 3a may be used that requires no direct simultaneous operation between video lines that are a field or a frame apart. Thus, motion detector 37 is simpler than a motion detector that utilizes a frame store or a field store.

Figure 6:
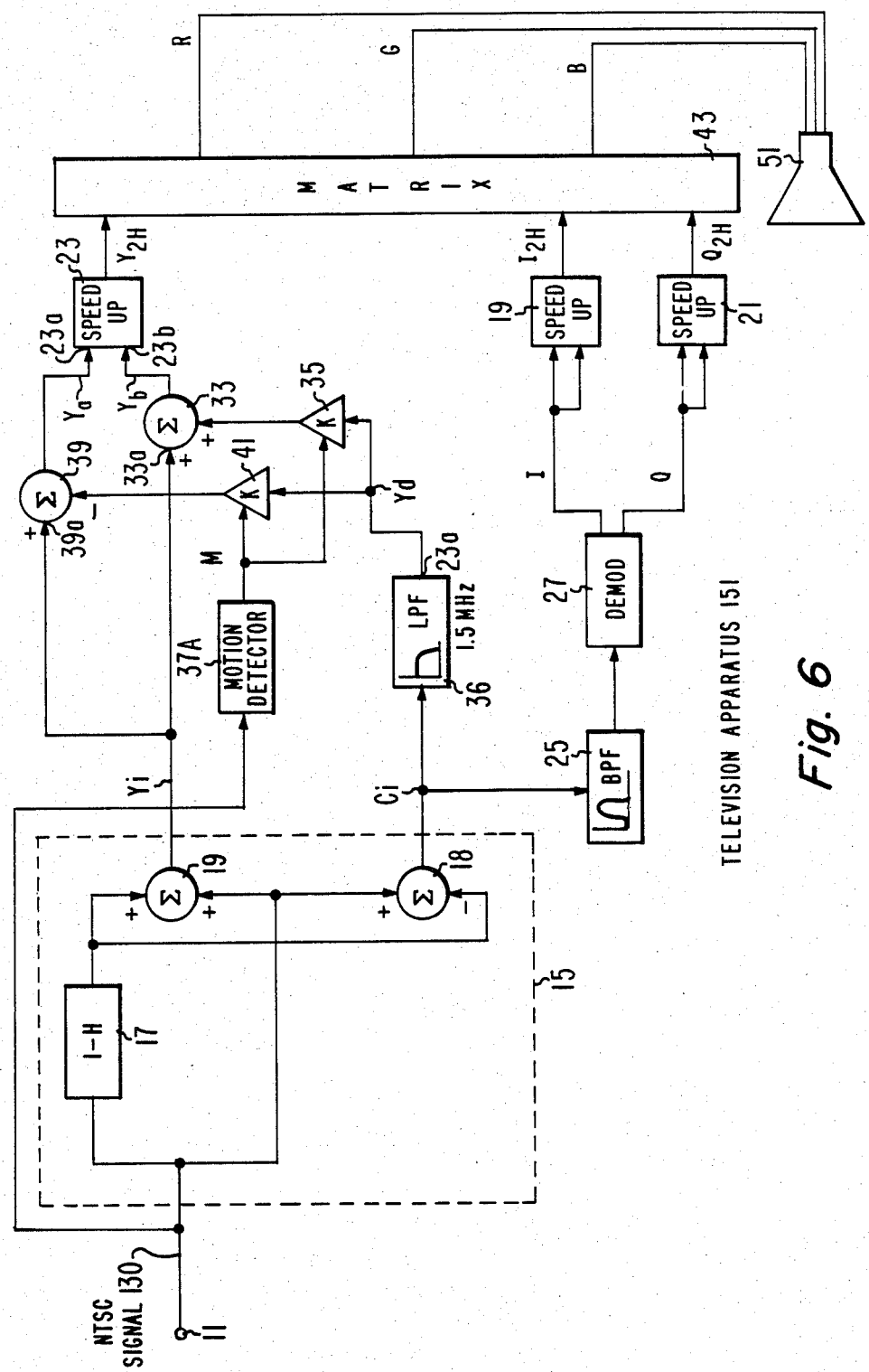
FIG. 6 illustrates a television apparatus that includes the motion detector of FIG. 7.
Figure 7:
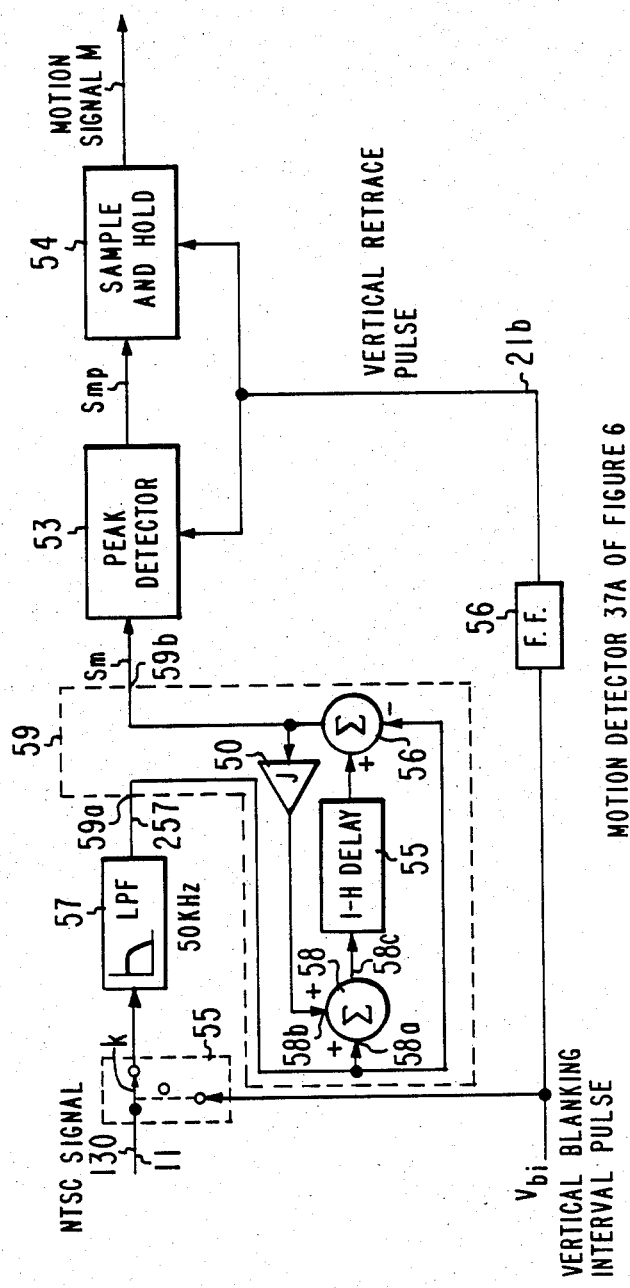
FIG. 7 illustrates another embodiment of the motion detector of the invention that includes a recursive comb filter.

FIG. 6 illustrates a television apparatus 151 that includes another motion detector according to the invention-motion detector 37A. FIG. 7 illustrates a detailed embodiment of this motion detector. Identical numbers in FIGS. 1, 3a–c, 6 and 7 indicate similar items or functions. In the detailed embodiment of FIG. 7, NTSC signal 130 of FIG. 6 is coupled through a switch 55, that performs similar functions as in motion detector 37 of FIG. 1, and through a low pass filter 57, having a cutoff frequency of, illustratively, 50 KHz, to form a signal 257. It should be understood that a substantially higher cutoff frequency may be used. Signal 257 is coupled to an input terminal 59a of a well known recursive filter 59. Signal 257, that is to be filtered in recursive filter 59, is coupled to an input terminal 58a of an adder 58 of recursive filter 59. An output signal 58c of adder 58 is coupled to an input terminal of a subtractor 56 through a 1-H delay 55. Signal 257 is subtracted from the 1-H delayed signal in subtractor 56. An output terminal 59b of subtractor 56 provides signal Sm that is also coupled to an attenuator 50 having a gain factor J. The output of attenuator 50 is coupled to an input terminal 58b of adder 58. Adder 58 sums the signals at terminals 58a and 58b, respectively, to form output signal 58c. When J is equal to 0, recursive filter 59 may be recognized as being the conventional line comb filter having nulls at multiples of the horizontal frequency of NTSC signal 130. As J increases, each band of frequencies, or notch, that is passed below and above each odd multiples of ½ the horizontal frequency of NTSC signal 130, becomes narrower.

FIG. 2c illustrates the transfer function A of the filter that is formed by low pass filter 57 followed by recursive filter 59, as illustrated in FIG. 6. The transfer function A of FIG. 2c equals the ratio, as a function of frequency, between the absolute value of the signal at output terminal 59b and that at input terminal 11. Attenuator 50 of FIG. 7 controls the magnitude of the feedback in recursive filter 59. In doing so, attenuator 50 controls the shape of transfer function A. Thus, by judicious selection of the feedback, the width of each band of frequencies that is passed by filter 59 may be controlled.

As explained before, the energy of the sidebands of NTSC signal 130 at the band of frequencies that is passed by recursive filter 59, increases when motion occurs. Low pass filter 57 reduces chrominance containing sidebands in low pass filtered signal 257; therefore, signal Sm primarily contains motion related sidebands.

Signal Sm at terminal 59b is coupled through peak detector 53 and sample and hold circuit 54 to form motion signal M. Peak detector 53 and sample and hold circuit 54 are, illustratively, identical to those in motion detector 37 of FIG. 3, respectively, and operate similarly. Motion detector 37A of FIG. 7 that detects motion in a plurality of frequency bands, rather than in only one frequency band as in motion detector 37 of FIG. 3, may exhibit improved noise immunity characteristics.

What is claimed is:

1. A detector responsive to a first component signal from a television signal for producing therefrom a motion indicative signal, comprising:
    a band pass filter that operates on video lines of said first component signal for extracting from said first component signal a signal portion in a predetermined frequency band, wherein said predetermined frequency band includes substantial spectral content only when said first signal is representative of a non-stationary picture scene, wherein in said filter a given pair of video lines of said television signal are directly coupled for simultaneous operation therebetween only if the time period separating therebetween is substantially shorter than a field time of said television signal;
    means coupled to receive said signal portion that is extracted by said filter for producing in accordance with the amplitude thereof, said motion indicative signal; and wherein
    said predetermined frequency band includes a high end frequency, said high end frequency being below the picture frame repetition rate.

2. The detector as recited in claim 1 wherein the low end frequency in said frequency band is above zero frequency.

3. The detector as recited in claim 1 wherein said filter comprises a line comb filter coupled to receive said television signal for reducing the amplitude of said first component signal at zero frequency, and a second filter responsive to the output of said line comb filter for producing said predetermined frequency band, said motion indicative signal being developed at the output of said second filter.

4. The detector as recited in claim 1 wherein said motion indicative signal producing means comprises a peak detector in cascade connection with a sample and hold means said peak detector being responsive to said signal portion for producing therefrom the absolute peak value of said signal portion that occurs in a given time period said sample and hold means being responsive for delaying said peak value for said given time period, said given time being substantially in excess of one line of said television signal.

5. The detector as recited in claim 4 wherein said time period is one frame period of said television signal.

6. A detector responsive to a first component signal from a television signal for producing therefrom a motion indicative signal, comprising:
    a line comb filter responsive to said television signal for reducing the amplitude of said first component signal at zero frequency; and
    a low pass filter coupled to receive said signal that is produced by said line comb filter for producing a signal portion of said first component signal, wherein the amplitude of said signal portion that is produced by said low pass filter contains motion induced sidebands in the presence of motion; and wherein
    said low pass filter has an upper cutoff frequency equal to the frame rate of said television signal.

7. The detector as recited in claim 6 wherein said line comb filter comprises means for delaying said television signal by a video line time of said television signal and means for subtractively combining the delayed and undelayed television signal to produce said signal portion of said first component signal.

8. The detector as recited in claim 6 further comprising peak detector means coupled to said low pass filter for detecting peaks in amplitude of said motion induced sidebands and sample and hold means coupled to said peak detector for producing from the output of said sample and hold means said motion indicative signal in regular time intervals, substantially greater than a line interval of said television signal, wherein in a given time interval said sample and hold means provides an output signal representative of the peak value of said signal portion of the immediately preceding time interval.

9. The detector as recited in claim 8 wherein said time interval is one frame period of said television signal.

10. A detector responsive to a first component signal from a television signal for producing therefrom a motion indicative signal, comprising:
    a line comb filter coupled to receive said television signal for producing therefrom at the output of said line comb filter an output signal having spectral content in the vicinity of a given frequency that is an odd multiple of one half the scan line rate of said television signal, said line comb filter being of the recursive type having feedback adjusted such that said line comb filter exhibits a passband characteristic which extends above and below said given frequency by an amount less than the frame rate of said television signal; and
    means coupled to receive said signal at the output of said line comb filter for producing in accordance with the amplitude thereof, said motion indicative signal.

11. The detector as recited in claim 10 wherein said first component signal contains luminance information further comprising, a low pass filter for reducing, from said signal at the output of said line comb filter, a chrominance component signal of said television signal.

12. A motion detector, comprising:
    input means for receiving a video input signal having a given frame rate, said video input signal having spectral components located at a frequency of zero hertz and at integer multiples of said given frame rate;
    bandpass filter means coupled to said input means and having a bandpass characteristic with a low cut-off frequency and a high cut-off frequency, said cut-off frequencies being located between a selected pair of contiguous ones of said spectral components and defining a bandpass region having solely one peak located between said selected pair of contiguous spectral components and having a bandwidth of less than said given frame rate for providing a bandpass filtered output signal representative of motion sidebands of said video input signal; and detector means coupled to an output of said bandpass filter means and responsive to said filtered output signal for providing a detected output signal for a given time interval representative of motion occurring in a previous time interval.

13. A motion detector as recited in claim 12 wherein said previous time interval comprises one frame period of said video input signal.

* * * * *